Jan. 25, 1927. 1,615,716
A. L. MOON
POTATO DIGGER
Filed Feb. 7, 1925 2 Sheets-Sheet 1
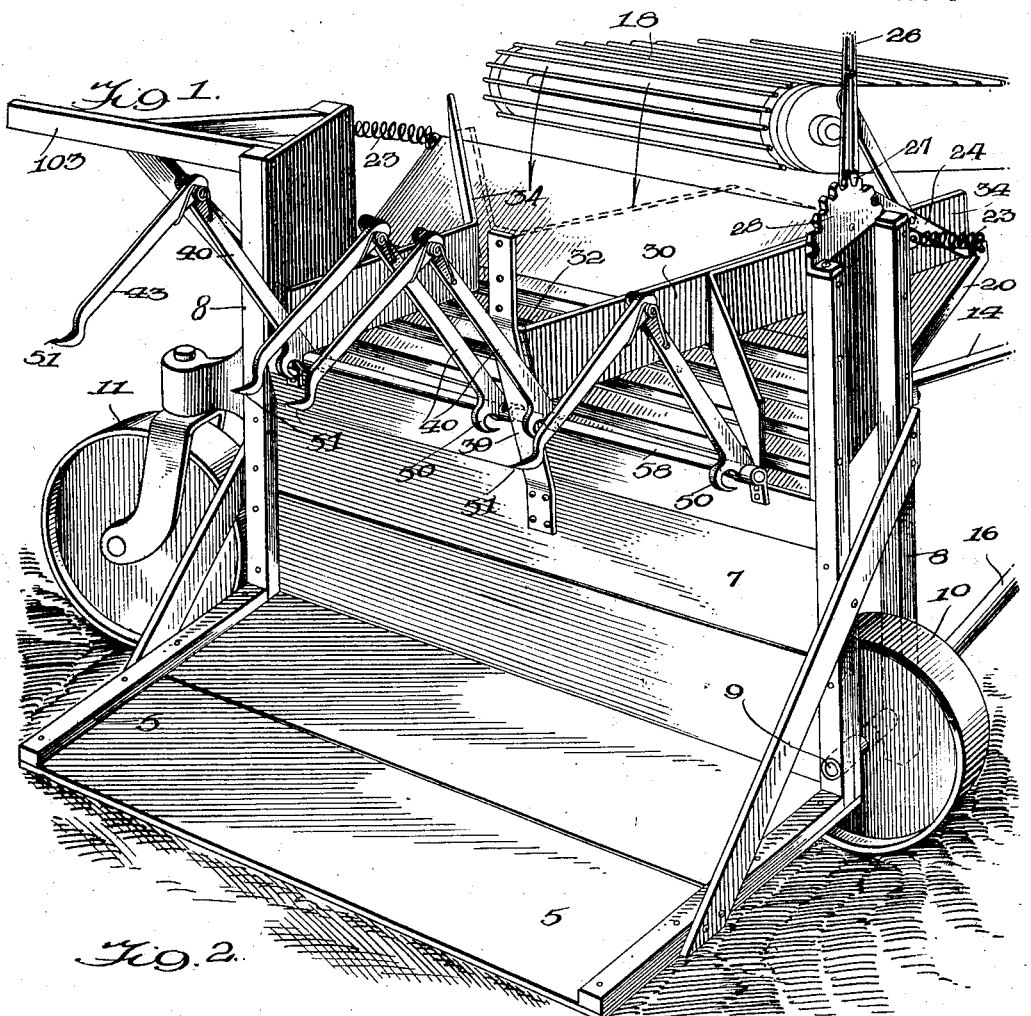
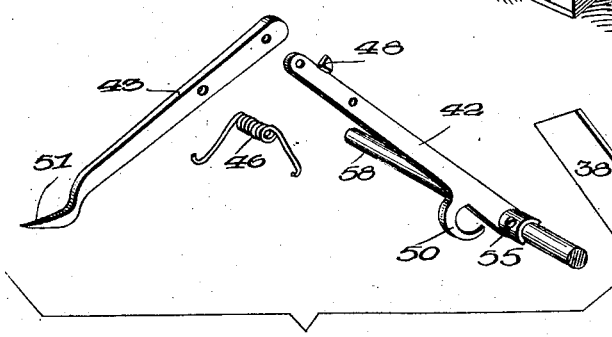
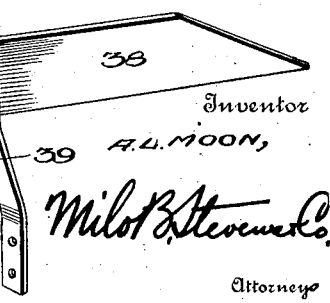
Inventor
A. L. MOON,
By Milo B. Stevens & Co.
Attorneys Jan. 25, 1927.
A. L. MOON
1,615,716
POTATO DIGGER
Filed Feb. 7, 1925   2 Sheets-Sheet 2
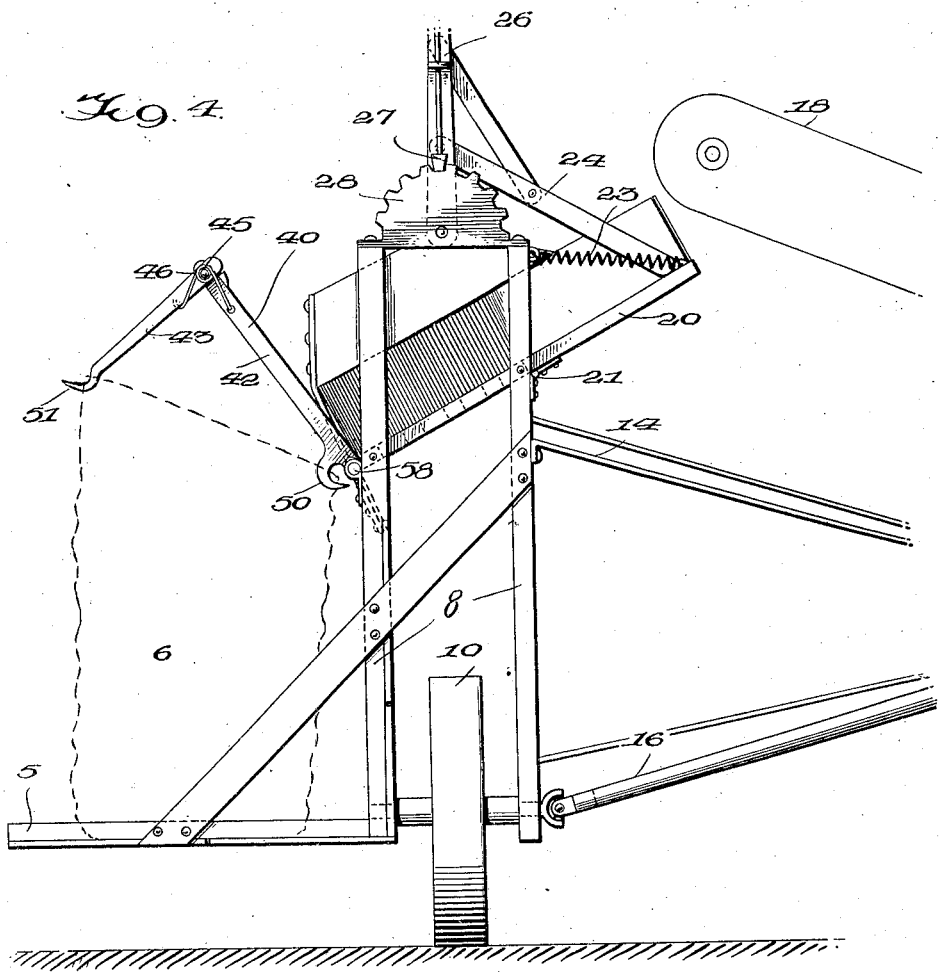
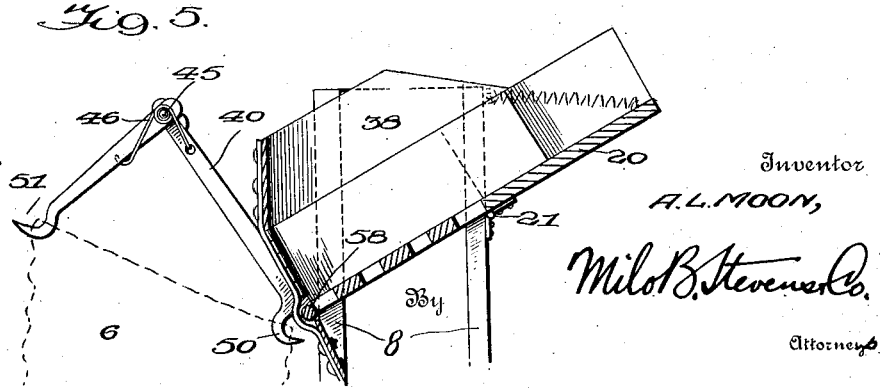
Inventor
A. L. MOON,
By Milo B. Stevens Co.
Attorneys Patented Jan. 25, 1927.

1,615,716

UNITED STATES PATENT OFFICE.

ALONZO L. MOON, OF MITCHELL, NEBRASKA.

POTATO DIGGER.

Application filed February 7, 1925. Serial No. 7,680.

This invention relates to potato diggers, and more particularly to a sack mechanism for use in connection therewith.

An important object of this invention is to provide a potato sacker having simple means whereby the flow of potatoes may be diverted from one sack to the other without inconvenience.

A further aim is to provide a potato sacker having simple means to separate dirt and trash from the potatoes before the potatoes are introduced into the sacks.

Also an important aim of this invention is to provide a novel form of sack support which may be quickly and conveniently attached to or disconnected from the sacks.

Other objects and advantages will be apparent during the course of the following description.

In the accompanying drawing forming a part of this application, and in which like numerals are employed to designate like parts throughout the same—

Fig. 1 is a perspective of the improved potato sacker.

Fig. 2 is a group perspective of one of the sack engaging members.

Fig. 3 is a perspective of a fixed guide member embodied in the invention.

Fig. 4 is a side elevation of the improved sacking mechanism in use.

Fig. 5 is a vertical sectional view through the sacking mechanism.

In the drawing wherein for the purpose of illustration is shown a preferred embodiment of the invention, the numeral 5 designates a platform upon which a plurality of sacks 6 are mounted, and by reference to Figure 1, it will be seen that the platform 5 is provided with an upstanding side wall 7, and end supports 8. The front end support 8 is provided with an axle 9 to which a wheel 10 is connected, and this wheel in conjunction with a rear wheel 11 forms a means whereby the platform may travel over the ground with the potato digger to which it is connected.

In this connection it might be said that the improved sacker is adapted for use on or with a potato digger of any desired construction, and is secured thereto by the connecting rods and braces 14 and 16. The members 14 and 16, which may be located at the front and rear of the sacker, maintain the sacker in proper position to receive the potatoes as they are discharged from the conveyor 18 of the potato digger. It will be seen that the member 16 has connection with the axle 9 of the sacker.

As the potato digger forms no part of this invention, it has not been fully illustrated, and it is believed to be obvious that the members 14 and 16 form a reliable means to maintain the improved sacker in a receptive position during the travel of the potato digger.

As the potatoes are discharged from the conveyor 18, they drop onto a tray 20, pivoted or hinged to the supports 8, as indicated at 21. Figure 4 plainly illustrates that the hinges 21 are located between the upper and lower ends of the tray so that the inclination of the tray may be varied.

The lower portion of the tray is slotted, as clearly shown in Figure 1, to provide for the discharge of dirt, trash and leaves in the potatoes, while the potatoes continue over the tray so that the same are directed into the sack.

Figure 1 illustrates that the tray 20 has connection with springs 23 which urge the tray upwardly into engagement with the lower end of a link 24. However, there is no fixed connection between the link 24 and the tray and thus the tray may yield to some extent in case it is engaged by the conveyor 18 when the conveyor is bobbed up and down as a result of the movement of the machine over rough ground.

The link has connection at one end with a lever 26 having a dog 27 which engages a segment 28 to hold the lever in a fixed position. It will thus be seen that the link 24 holds the tray down against the tension of the springs 23. In case there is but a small quantity of dirt and trash mixed with the potatoes, the tray may be positioned at a substantial angle to provide for the rapid movement of the potatoes into the sack. On the other hand, if there is a substantial quantity of dirt, trash and the like mixed with the potatoes, the tray 20 is positioned so that it is inclined only slightly. This allows ample time for the separation of the dirt, etc., from the potatoes.

Particular attention is invited to Figure 1 which illustrates that the potatoes upon passing over the tray will encounter a partition 30, pivotally supported at its lower end as indicated at 32, so that it may be swung flatly into contact with either one of the V-shaped chute sections 34 mounted upon the tray.

In carrying out the invention, the partition 30 is pivoted to the lower edge of the tray between the ends thereof so that when it is positioned as illustrated in Figure 1, it will cut off the supply of potatoes to one of the sacks and cause all of the potatoes to go into the other sack. Thus, when one sack has been filled, the supply of potatoes may be diverted to the other sack.

A fixed V-shaped guard 38 overhangs the chute sections 34 and is located at its apex above the pivot of the swinging partition 30. This wing 38 is provided with an attaching strap 39 which may be secured to the lower portion of the tray so that it at all times remains in a fixed position with respect to the tray.

The sacks may be held in an open position by arms generally designated by the numeral 40, and consisting of inner and outer sections 42 and 43. The sections 42 and 43 are pivotally connected to each other, as indicated at 45, and are urged to their extended positions by springs 46, the terminals of which are hooked about or are otherwise secured to the sections 42 and 43.

Figures 2 and 4 plainly illustrate that each section 42 is provided with a lug 48, which limits the extension of the arms to the position illustrated in Figure 1. However, when it is desired to detach the sacks, it is merely necessary to move the sections 42 and 43 toward their collapsed position so that the hooks 50 and 51 may be moved out of engagement with opposite sides of the sack.

Figures 1 and 2 illustrate that each section 42 is provided with a hub 55 which is mounted on a shaft 58 at the lower end of the tray.

Figure 4 plainly illustrates that the outer portion of the sack is substantially higher than the inner portion of the sack so that the collection of all the potatoes in the sack is assured. This arrangement expedites the connection and disconnection of the sack to the arms and from the arms. If any of the potatoes are bounced during their movement over the tray the outer portion of the sack will catch the same. This allows the potatoes to be passed to the tray at a rapid rate.

With reference to the foregoing description taken in connection with the accompanying drawing, it will be seen that when the potatoes are discharged onto the tray 20, the potatoes will be directed into one of the sacks until that sack is filled, and then the position of the partition 30 is changed so that the potatoes will be directed into the other sack.

The improved sacking mechanism may be employed without in any way interfering with the operation of the potato digger and without requiring a special attendant. A bracket 103 is carried by one end wall 8 and forms a support for extra sacks.

Having thus described the invention, what is claimed is:

1. A potato sacker comprising a horizontal platform having an up-standing side wall, end supports associated with the side wall, a tray horizontally hinged intermediate the upper and lower edges thereof to said end supports, a link bearing against said tray, a spring connected to said tray and holding the same in engagement with said link, and a lever having means connected to said link to adjust the same, one end portion of said tray being beneath the discharge conveyer of a potato digger and being yieldable under influence of the same.

2. A potato sacker comprising a mobile frame, a tray pivoted at the upper portion of the frame, means at the lower end of the tray for holding the sacks in open position, a partition pivoted to the lower end of the tray and adapted to direct the potatoes into one sack or the other, V-shaped members arranged upon the tray and adapted for engagement by said partition to cooperate with the same in directing the potatoes into one of the sacks, and a fixed V-shaped wing extending over the tray in spaced relation thereto and cooperating with the partition in directing the potatoes into the proper sack.

3. A potato sacker comprising a mobile frame, a tray pivoted at the upper portion of the frame, means at the lower end of the tray for holding the sacks in open position, a partition pivoted to the lower end of the tray and adapted to direct the potatoes into one sack or the other, V-shaped members arranged upon the tray and adapted for engagement by said partition to cooperate with the same in directing the potatoes into one of the sacks, a fixed V-shaped wing extending over the tray in spaced relation thereto and cooperating with the partition in directing the potatoes into the proper sack, and means whereby said tray may be adjusted about a horizontal axis.

4. A potato sacker comprising a horizontal platform having an up-standing side wall, end supports associated with the side wall, a tray horizontally hinged intermediate the upper and lower edges thereof to said end supports, a link connected to said tray, a lever connected to said link and having means to hold the tray in a fixed position, V-shaped members mounted on said tray, a partition pivoted to the lower edge of the tray and adapted to swing flatly into contact with one or the other of said V-shaped members, a fixed V-shaped wing having branches adapted to overhang said partition to cooperate with the same in guiding the potatoes, and a shaft arranged at the lower edge of the tray, and sack holding devices carried by said shaft.

In testimony whereof I affix my signature.

ALONZO L. MOON.